United States Patent
Kim et al.

(10) Patent No.: US 10,187,787 B2
(45) Date of Patent: Jan. 22, 2019

(54) BEACON DEVICE USING GS1 CODE, OPERATING METHOD THEREOF AND SERVICE PROVIDING METHOD USING THE SAME

(71) Applicant: KOREA ADVANCED INSTITUTE OF SCIENCE AND TECHNOLOGY, Daejeon (KR)

(72) Inventors: Daeyoung Kim, Daejeon (KR); Wondeuk Yoon, Daejeon (KR); Kiwoong Kwon, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 128 days.

(21) Appl. No.: 15/293,031

(22) Filed: Oct. 13, 2016

(65) Prior Publication Data
US 2017/0181063 A1   Jun. 22, 2017

(30) Foreign Application Priority Data

Dec. 18, 2015  (KR) ........................ 10-2015-0182118
Apr. 26, 2016  (KR) ........................ 10-2016-0050668

(51) Int. Cl.
| | |
|---|---|
| *H04W 4/80* | (2018.01) |
| *H04W 8/20* | (2009.01) |
| *G06Q 30/02* | (2012.01) |
| *H04W 48/12* | (2009.01) |
| *H04W 48/18* | (2009.01) |
| *H04W 8/22* | (2009.01) |

(52) U.S. Cl.
CPC ........ *H04W 8/205* (2013.01); *G06Q 30/0241* (2013.01); *H04W 4/80* (2018.02); *H04W 48/12* (2013.01); *H04W 48/18* (2013.01); *H04W 8/22* (2013.01)

(58) Field of Classification Search
None
See application file for complete search history.

(56) References Cited

U.S. PATENT DOCUMENTS

| | | | | |
|---|---|---|---|---|
| 2010/0289627 | A1* | 11/2010 | McAllister | G06Q 10/087 340/10.42 |
| 2012/0150748 | A1* | 6/2012 | Law | G06Q 20/20 705/71 |
| 2012/0150750 | A1* | 6/2012 | Law | G06Q 20/20 705/76 |

(Continued)

*Primary Examiner* — Brian Whipple
(74) *Attorney, Agent, or Firm* — Pearl Cohen Zedek Latzer Baratz LLP

(57) ABSTRACT

Provided is a method that enables a user terminal to receive a list of services associated with Global Standard #1 (GS1) code information from an Object Name Service (ONS) server based on data that includes GS1 code information received from a beacon device, and to receive a desired service from a service provider server. The user terminal requests the ONS server for a list of services associated with the GS1 code information based on the GS1 code information received from the beacon device, and generates and outputs the list based on information received from the ONS server. The user terminal receives information about a desired service from a service provider server in response to a selection of a user on the output list and provides the received information about the desired service to the user.

18 Claims, 13 Drawing Sheets

(56) References Cited

U.S. PATENT DOCUMENTS

| | | | |
|---|---|---|---|
| 2014/0143029 A1* | 5/2014 | Kail | G06Q 30/0207 |
| | | | 705/14.1 |
| 2014/0157370 A1* | 6/2014 | Plattner | G06F 21/6245 |
| | | | 726/4 |
| 2016/0285979 A1* | 9/2016 | Wang | H04L 67/16 |

* cited by examiner

BEACON DEVICE USING GS1 CODE, OPERATING METHOD THEREOF AND SERVICE PROVIDING METHOD USING THE SAME

CROSS-REFERENCE TO RELATED APPLICATION(S)

This application claims priority under 35 U.S.C. § 119 to Korean Patent Application No. 10-2015-0182118 filed Dec. 18, 2015, and Korean Patent Application No. 10-2016-0050668 filed Apr. 26, 2016, in the Korean Intellectual Property Office (KIPO), the entire contents of which are incorporated herein by reference.

FIELD OF THE INVENTION

One or more example embodiments relate to a beacon device and a method of providing a service to a user terminal, for example, a smartphone, based on data received through the beacon device, and more particularly, to a method of providing a desired service associated with a Global Standard #1 (GS1) code to a user terminal that receives data including the GS1 code from a beacon device.

BACKGROUND OF THE INVENTION

Currently, technology that provides a variety of services to a terminal, such as a smartphone, using a Bluetooth Low Energy (BLE) based beacon has been developed. A service provided to a user terminal includes, for example, a location information service associated with a location at which a beacon is located or a product to which a beacon is attached, a coupon providing service, price information providing service, a payment service, and the like.

A beacon broadcasts data that includes an identifier, for example, a Universally Unique Identifier (UUID) defined by a manufacturer of each beacon or a service provider. The UUID is received at a terminal of a user, and the user uses a service provided from the service provider by executing an application associated with the beacon on the terminal. However, the beacon separately operates by the service provider that provides the service. To utilize a corresponding service, the user is to install and execute a separate application developed for the service on the terminal of the user. It may cause unnecessary consumption of resources at the terminal of the user, which may lead the user to have some negative ideas about a beacon service.

Also, if the terminal, for example, a smartphone, of the user receives the UUID from an unknown beacon and a relevant application is not installed on the terminal, the user may not identify a service associated with the UUID. Only a single service may be provided using a beacon. The user needs to take some cumbersome to install and execute an application for each service on the terminal. Further, the more the number of companies providing a beacon related service, the more the user is to accept such unnecessary service as spam.

Accordingly, there is a need in the art for a beacon service providing method and a beacon device that may provide multiple services, that is, a plurality of services, using a single beacon, and may not demand installation and execution of an unnecessary application on a terminal to provide a variety of services to a user through the terminal.

Korean Patent Publication No. 10-2014-0097074, published on Aug. 6, 2014, discloses a system and method of advertisement and auto-order for restaurant using beacon (Bluetooth) technology that may push and send a coupon or an advertising message to a customer passing by a corresponding restaurant using a beach technology (transmittable by 50 m).

The aforementioned information is provided only to help in understanding and may include content not used to form a portion of the related art and may not include content that the related art may present to those of ordinary skill in the art.

SUMMARY

One or more example embodiments provide a method that may store data that includes Global Standard #1 (GS1) code(s) associated with at least one service, may output a list of services associated with GS1 code(s) to a user terminal using a beacon device that transmits the data including the GS1 code(s) to the user terminal, and enables a user of the user terminal to select and execute a desired service from among services included in the list displayed on the user terminal.

One or more example embodiments also provide a service providing method that may receive data that includes GS1 code(s) associated with at least one service from a beacon, may generate a list of services associated with corresponding GS1 code(s) based on information obtained from an Object Name Service (ONS) server, and may provide a desired service included in the list from a service provider server in response to a selection of a user, so that the user may receive the desired service without installing and/or executing a separate application required for the service.

According to an aspect, there is provided a service providing method including receiving, from a beacon device, data that includes GS1 code information associated with information about at least one product or a service of the product; requesting an ONS server for a list of information about the at least one product or service based on the GS1 code information extracted from the received data; outputting the list based on information about the list that is received from the ONS server in response to the request; and obtaining and providing desired information about a product or information about a desired service included in the list from a service provider server in response to a selection of a user on the list.

Each of the at least one product or service may be associated with a GS1 code included in the GS1 code information, in a record format, and The outputting of the list may include outputting the list by receiving, from the ONS server, information about the list that includes a record associated with the at least one product or service, and the record may include information for access to the service provider server that provides the at least one product or service.

The service providing method may further include determining a scheme for receiving data from the beacon device in one of an active scanning mode and a passive scanning mode.

A type of a GS1 code included in the received data may be differentiated based on the determined scheme.

The data that includes the received GS1 code information may be at least one of data of an advertising data format and data of a scan response data format, Each of the data of the advertising data format and the data of the scan response data format may include GS1 code information that includes different at least one GS1 code, and The receiving of the data may include receiving the data of the advertising data format in response to the determined scheme being the passive scanning mode; and receiving the data of the advertising data format and the data of the scan response data format in response to the determined scheme being the active scanning mode.

The GS1 code information may include at least one GS1 code.

The at least one GS1 code may include at least one of a GS1 code that classifies a specific product or content for each class and a GS1 code that classifies the specific product or content for each instance.

The GS1 code information may include the GS1 code that classifies the specific product or content for each class and the GS1 code that classifies the specific product or content for each instance.

The outputting of the list may include outputting a list of services associated with the specific product or content from the ONS server in response to a request using the GS1 code that classifies the specific product or content for each class.

The obtaining and the providing of the desired service may include transferring the GS1 code that classifies the specific product or content for each instance to a service provider server that provides a service selected by the user from the list.

The obtaining and the providing of the desired service may include providing a service associated with the specific product or content based on instance information of the specific product or content received from the service provider server to which the GS1 code that classifies the specific product or content for each instance is transferred.

The service providing method may further include storing at least a portion of data required to output the list as cache data.

The outputting of the list may include generating and outputting the list by combining the cache data and information about the list.

The data stored as the cache data may be determined based on a Least Recently Used (LRU) algorithm.

Information about the at least one product or service associated with the GS1 code information may include at least one of a global service the user is accessible to without separate authentication and a local service the user is accessible to after authentication.

The obtaining and the providing of the desired service may include providing the local service once the authentication of the user is completed in response to a selection of the user on the local service from the list.

At least one global service and at least one local service associated with the GS1 code information included in the list may be distinguished from each other within the list and thereby output.

Information about the list may include service type information of the at least one product or service.

Information for the access may include uniform resource locator (URL) information for access to the service provider server that provides the at least one product or service.

The service type information may include at least one of information associated with an indication of the at least one product or service within the list, information indicating whether the at least one product or service corresponds to a global service, and information indicating a class or a level of the at least one product or service.

According to another aspect, there is provided a beacon device including a storage configured to store data that includes GS1 code information including at least one GS1 code associated with information about at least one product or a service of the product; and a communicator configured to output the data that includes the GS1 code information to a user terminal, in order to provide information about a list of the at least one product or service to the user terminal at a remote place.

The data may be data of an advertising data format or data of a scan response data format.

Each of the data of the advertising data format and the data of the scan response data format may include GS1 code information that indicates different at least one GS1 code.

The communicator may be further configured to output the data of the advertising data format to the user terminal in response to a data reception scheme of the user terminal being a passive scanning mode, and to transmit the data of the advertising data format and the data of the scan response data format to the user terminal in response to the data reception scheme of the user terminal being an active scanning mode.

The GS1 code information may include a plurality of GS1 codes.

The plurality of GS1 codes may include a GS1 code that classifies a specific product or content for each class and a GS1 code that classifies the specific product or content for each instance.

The GS1 code that classifies the specific product or content for each class may be used to provide the list to the user terminal.

The GS1 code that classifies the specific product or content for each instance may be used as a parameter to provide a service associated with the specific product or content to the user terminal.

The GS1 code information may include at least one of a global service a user of the user terminal is accessible to without separate authentication and a local service the user is accessible to after authentication, as information about the at least one product or service.

The communicator may be further configured to communicate with the user terminal through Bluetooth Low Energy (BLE).

The communicator may be further configured to connect to an external terminal through connection to the Internet directly or via a gateway.

A parameter that configures the data stored in the storage or settings of the beacon device may be configured to be changed through the external terminal.

According to another aspect, there is provided a terminal device including a communicator configured to receive, from a beacon device, data that includes GS1 code information associated with information about at least one product or a service of the product; a controller configured to request an ONS server for a list of information about the at least one product or service based on the GS1 code information extracted from the received data, to obtain the list based on information about the list that is received from the ONS server in response to the request, and to obtain desired information about a product or information about a desired service included in the list from a service provider server in response to a selection of a user on the list; and a display configured to output the list and the desired information or the desired service.

According to another aspect, there is provided an operation method of a beacon device, the method including configuring data that includes GS1 code information including at least one GS1 code associated with information about at least one product or a service of the product; storing the configured data; and outputting the data that includes the GS1 code information to a user terminal in order to provide a list of information about the at least one product or service to the user terminal at a remote place.

According to at least some example embodiments, by applying a GS1 code associated with a plurality of services and globally standardized to a beacon device, the plurality of services associated with the GS1 code may be provided to a user through a user terminal using a single beacon device. Regardless of a manufacturer of the beacon device, a service may be provided from any service provider to the user.

According to at least some example embodiments, since a beacon device may output data that includes a plurality of GS1 codes, a plurality of services associated with a specific product or content may be provided. Alternatively, a service associated with a class of the specific content or content and a service associated with an instance of the specific product or content may be provided.

According to at least some example embodiments, since a GS1 code included in data received at a user terminal is configured to be different based on a scanning mode of the user terminal, a service suitable for a state of the user terminal or a user demand and necessity may be efficiently provided.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
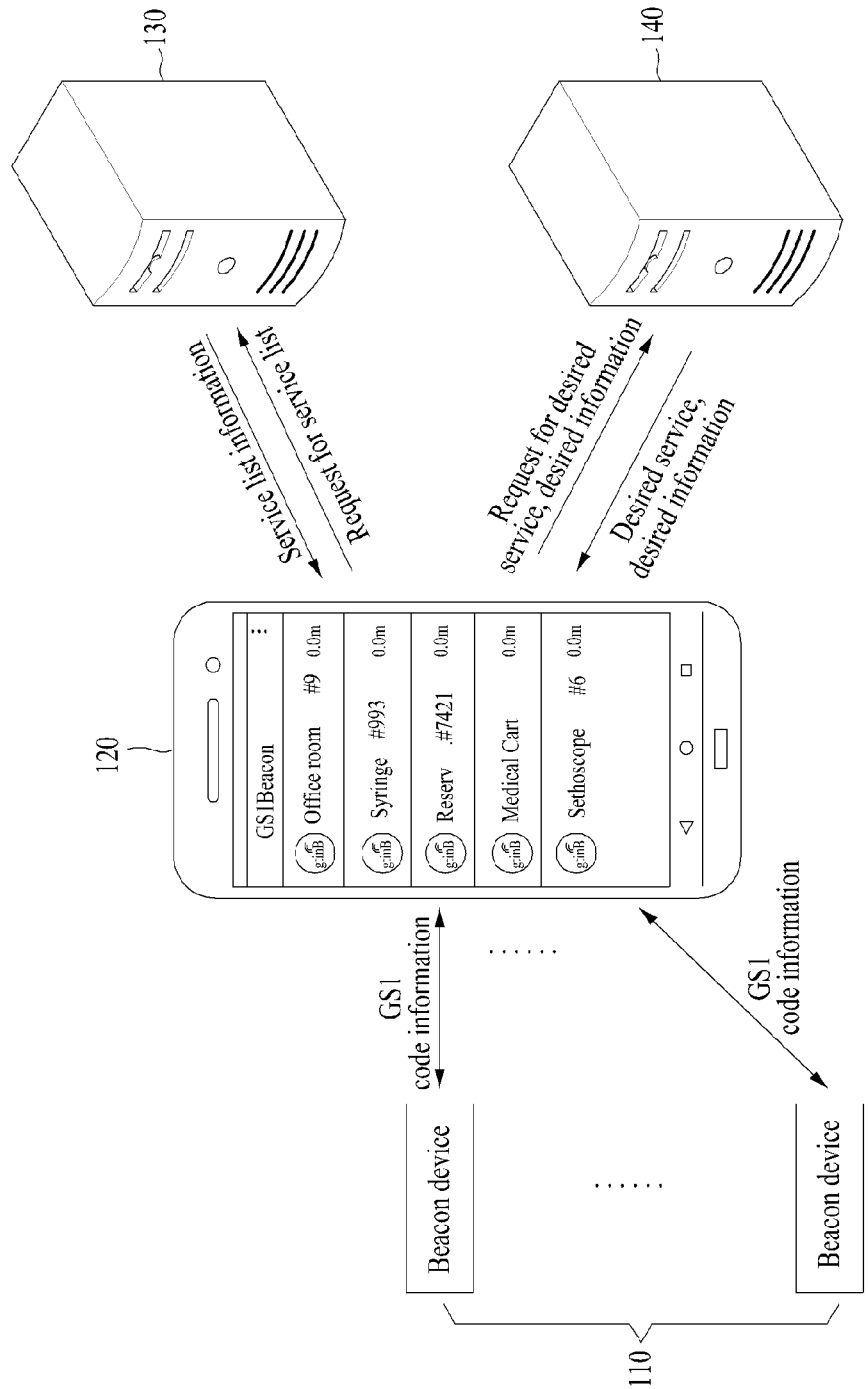
FIG. 1 is a diagram illustrating an example of providing desired information or a desired service from a service provider server to a user terminal based on data that includes Global Standard #1 (GS1) code information received from a beacon device according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

FIG. 1 is a diagram illustrating an example of providing desired information or a desired service from a service provider server to a user terminal based on data that includes GS1 code information received from a beacon device according to at least one example embodiment.

Referring to FIG. 1, a user terminal 120 receives data that includes GS1 code information from beacon device(s) 110, transfers a GS1 code included in the GS1 code information received from the beacon device(s) 110 to an Object Name Service (ONS) server 130, receives information about a product and/or a list of services associated with the GS1 code from the ONS server 130, requests a service provider server 140 for a desired service or desired information, and receives the desired service or the desired information from the service provider server 140.

The beacon device (or, a beacon) 110 and the user terminal 120 may communicate with each other through Bluetooth Low Energy (BLE). That is, the beacon device 110 may output data that includes a GS1 code associated with information about at least one product and/or a service to the user terminal 120 through BLE.

The user terminal 120 may request the ONS server 130 for a list of information about the product and/or a list of services by extracting the GS1 code included in the data received from the beacon device 110 and by transferring the extracted GS1 code to the ONS server 130.

The ONS server 130 may search for information and a service associated with the received GS1 code and may transfer information used to generate a list information about the product and/or a list of services to the user terminal 120.

The user terminal 120 may generate and output a list of information about the product and/or a list of services based on information received from the ONS server 130. In response to a selection of a user of the user terminal 120 on desired information or a desired service from the output list, the user terminal 120 may request the service provider server 140 for the desired information or the desired service.

In response to the request from the user terminal 120, the service provider server 140 may provide the desired information or the desired service to the user terminal 120 or may transfer information used to provide the desired information or the desired service to the user terminal 120.

Example embodiments describe a system that provides at least one service to the user of the user terminal 120 through a single beacon device 110 using a GS1 code (e.g., Global Trade Item Number (GTIN), Global Location Number (GLN), Serial Shipping Container Code (SSCC), GAIS, Component/Part Identifier (CPID), etc.) defined in a GS1, an Object Name Service (ONS), and an Electronic Product Code Information service (EPCIS). A list of services provided to the user terminal 120 may be filtered based on interests, preferences, selections, and settings of the user.

The GS1 code may include, for example, a GS1 barcode. A GS1 barcode system may identify a product at any place in the world, and may further efficiently manage a supply chain to automatically identify a product at production/distribution/pre-consumption stages.

A plurality of products, contents, or services may be connected and information therebetween may be shared based on a standard infrastructure provided from the GS1 code system.

The GS1 code is a code identified based on a GS1 ID key, and, for example, may be represented as shown in the following Table 1.

TABLE 1

| GS1 ID key | Application Identifier decimal (hexadecimal) | Length decimal digits (byte length) |
| --- | --- | --- |
| GTIN | 01 (0x0001) | 8, 12, 13, 14 (4, 5, 6, 6) |
| GTIN serial number | 21 (0x0015) | N-20 (N-9) |
| GLN | 414 (0x019E) | 13 (6) |
| GLN extension | 254 (0x00FE) | N-20 (N-9) |
| SSCC | 00 (0x0000) | 18 (8) |
| GRAI | 8003 (0x1F43) | 13 (6) |
| GIAI | 8004 (0x1F44) | N-30 (N-13) |
| GSRN | 8017 (0x1F51), 8018 (0x1F52) | 18 (8) |

TABLE 1-continued

| GS1 ID key | Application Identifier decimal (hexadecimal) | Length decimal digits (byte length) |
| --- | --- | --- |
| GDTI | 253 (0x00FD) | 13-30 (6-13) |
| GINC | 403 (0x0192) | N-30 (N-13) |
| GSIN | 402 (0x0191) | 17 (8) |
| GCN | 255 (0x00FF) | 13-25 (6-11) |

For example, GTIN represents Global Trade Item Number, and may be a GS1 code used to identify an object (a product). Meanwhile, GLN represents Global Location Number and may be used to identify a location of an object.

ONS may be a service that discovers information about an object for each class of the object corresponding to a GS1 code of the object, for example, a product or a service. The ONS server 130 may be a server, another device, or equipment to provide an ONS A GS1 Element String (GS1ES) that may be included in a GS1 code or may correspond to the GS1 code may be converted to an ONS query, for example, a Fully Qualified Domain Name (FQDN)) typed query, and transferred to the ONS server 130. The ONS server 130 returns a service list associated with a corresponding GS1 ID to the user terminal 120. That is, the user terminal 120 may obtain a list of services associated with the GS1 code through the ONS server 130 and may access a desired service through the list.

The service provider server 140 may be a server that is operated by a service provider that provides information about a product associated with the GS1 code or a service associated with GS1 code information, that is, a GS1 code included in GS1 code information. A plurality of service provider servers 140 may be present. For example, each of the service provider servers 140 may be operated by a different service provider and configured to provide a different service.

For example, the service provider server 140 may be a server that provides a global service the user is accessible to without separate authentication or may be a server that provides a local service the user is accessible to after authentication, with respect to information about the at least one product or service associated with GS1 code information.

For example, if a GS1 code is a code associated with a specific product or service, a service provided from the service provider server 140 may be a service that provides information of a coupon, advertising, and a location of the product or the service.

A service that provides a coupon, advertising, an indoor location, and navigation information may correspond to the global service. The global service may be a service issued from and managed at GS1. Meanwhile, the local service may be a private service provided from a service provider, and may be a service issued from and managed at a private institution, for example, a store, a company, a hospital, etc. For example, a private service, such as a private wireless fidelity (Wi-Fi) authentication service, a private security service, a private map, etc., may correspond to the local service.

A service and information provided through the service provider server 140 may be a web based service and information.

Configurations of the beacon device 110 and the user terminal 120 and communication methods among the beacon device 110, the user terminal 120, the ONS server 130, and the service provider server 140 will be further described with reference to FIGS. 2 through 11.

Figure 2:
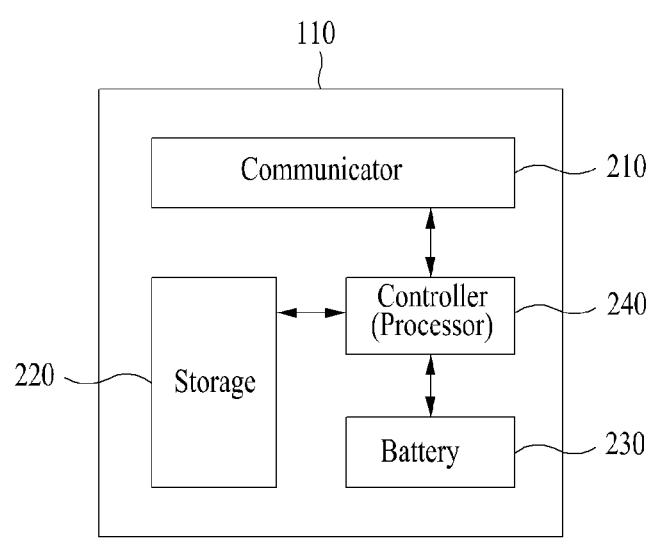
FIG. 2 is a block diagram illustrating a configuration of a beacon device configured to store data that includes GS1 code information and to output the data to a user terminal according to at least one example embodiment.

FIG. 2 is a block diagram illustrating a configuration of a beacon device configured to store data that includes GS1 code information and to output, for example, advertise the data to a user terminal according to at least one example embodiment.

The beacon device 110 of FIG. 2 may correspond to the beacon device 110 of FIG. 1. Referring to FIG. 2, the beacon device 110 may include a communicator 210 and a storage 220. Also, the beacon device 110 may further include a controller 240 configured to control the communicator 210 and the storage 220, and may include a battery 230 configured to supply power for operations of components included in the beacon device 110.

The communication 210 may include a Bluetooth module that supports, for example, BLE, for example, Bluetooth 4.0, as a device that communicates with the user terminal 120. The communicator 210 may transmit data to the user terminal 120 based on an advertising state defined in BLE specification. Also, the communicator 210 may transmit data of an advertising data format and/or data of a scan response data format to the user terminal 120 based on settings of the user terminal 120. The communicator 210 may be configured to periodically output data.

Also, the communicator 210 may further include a module configured to connect to an external terminal through connection to the Internet directly or to connect to the Internet via a gateway (e.g., a sharer or an access point (AP) device) and be connected to the external terminal.

The storage 220 may be any type of memory devices configured to store GS1 code information that includes a GS1 code and data that includes the GS1 code information. Data stored in the storage 220 may include information, for example, a beacon name and a beacon identifier, for identifying the corresponding beacon device 110. Data stored in the storage 220 may be set and/or changed by a manager of the beacon device 110.

The controller 240 refers to a configuration configured to control and manage the storage 220 and the communicator 210, and may be, for example, a processor or at least one core within the processor.

Configurations of the beacon device 110 and the user terminal 120, communication methods among the beacon device 110, the user terminal 120, the ONS server 130, and the service provider server 140, and data stored in and output from the beacon device 110 will be further described with reference to FIGS. 3 through 11.

Technical contents described above with FIG. 1 may be applicable as is and a further detailed description is omitted.

Figure 3:
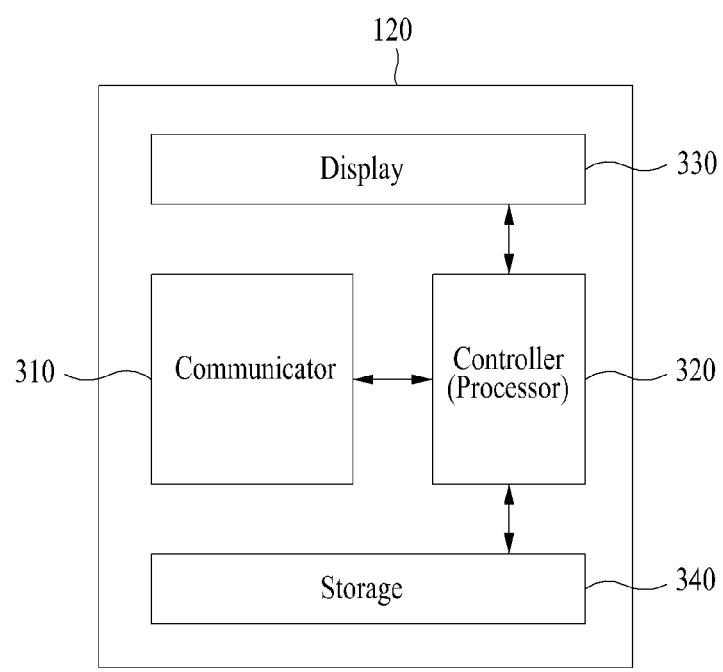
FIG. 3 is a block diagram illustrating a configuration of a user terminal configured to communicate with an Object Name Service (ONS) server and a service provider server based on GS1 code information received from a beacon device according to at least one example embodiment.

FIG. 3 is a block diagram illustrating a configuration of a user terminal configured to communicate with an ONS server and a service provider server based on GS1 code information received from a beacon device according to at least one example embodiment.

The user terminal 120 of FIG. 3 may correspond to the user terminal 120 of FIG. 1. Referring to FIG. 3, the user terminal 120 may include a communicator 310, a controller 320, and a display 330. Also, the user terminal 120 may further include a storage 340 configured to store data received from the beacon device 110 and the like and/or data used to drive the user terminal 120.

The user terminal 120 may be, for example, a personal computer (PC), a notebook computer, a laptop computer, a smartphone, a tablet, a wearable computer, and the like.

The communicator 310 may be a device configured to communicate with the beacon device 110, the ONS server 130, and the service provider server 140. That is, the communicator 310 may be a hardware module, such as a network interface card, a network interface chip, and a network interface port, etc., of the user terminal 120 that transmits and receive data and/or information to and from the beacon device 110, the ONS server 130, and the service provider server 140, or a software module, such as a network device driver or a networking program. The communicator 310 may include a Bluetooth module for communication with the communicator 210 of the beacon device 110.

The controller 320 may manage components of the user terminal 120, and may execute a program or an application used at the user terminal 120. For example, the controller 320 may execute an application configured to extract a GS1 code included in data received from the beacon device 110 by processing the data, to receive list information by requesting the ONS server 130 for a list of services associated with the GS1 code, to generate and output a list of services associated with the GS1 code, and to provide (output) a desired service based on information provided through communication with the service provider server 140. The application may be referred to as an "integrated application" in that it is possible to integrally provide a variety of services through a list of services without installing an application for each service.

Also, the controller 320 may process an operation used for executing a program or an application and processing data, and the like. The controller 320 may be at least one processor of the user terminal 120 or at least one core within the processor.

The display 330 may include a display device configured to output a list of services associated with the GS1 code and to output information and a service provided from the service provider server 140. The display 330 may include, for example, a touch screen. The user of the user terminal 120 may select a single beacon from among a plurality of beacons or may select a desired service from a list of services through a touch screen. A device to receive a user input may be a configuration separate from the display 330.

The storage 340 may include any type of memories or storage devices configured to store data or information of the user terminal 120. A program or an application executed at the controller 320 and information associated with the program or the application may be stored in the storage 340. The storage 340 may include a cache memory configured to store at least a portion of data used to generate and output information about a product and a list of services associated with the GS1 code, as cache data.

Communication methods among the beacon device 110, the user terminal 120, the ONS server 130, and the service provider server 140 and a method of generating and outputting a service list, and a method of providing a service will be further described with reference to FIGS. 4 through 11.

Figure 4:
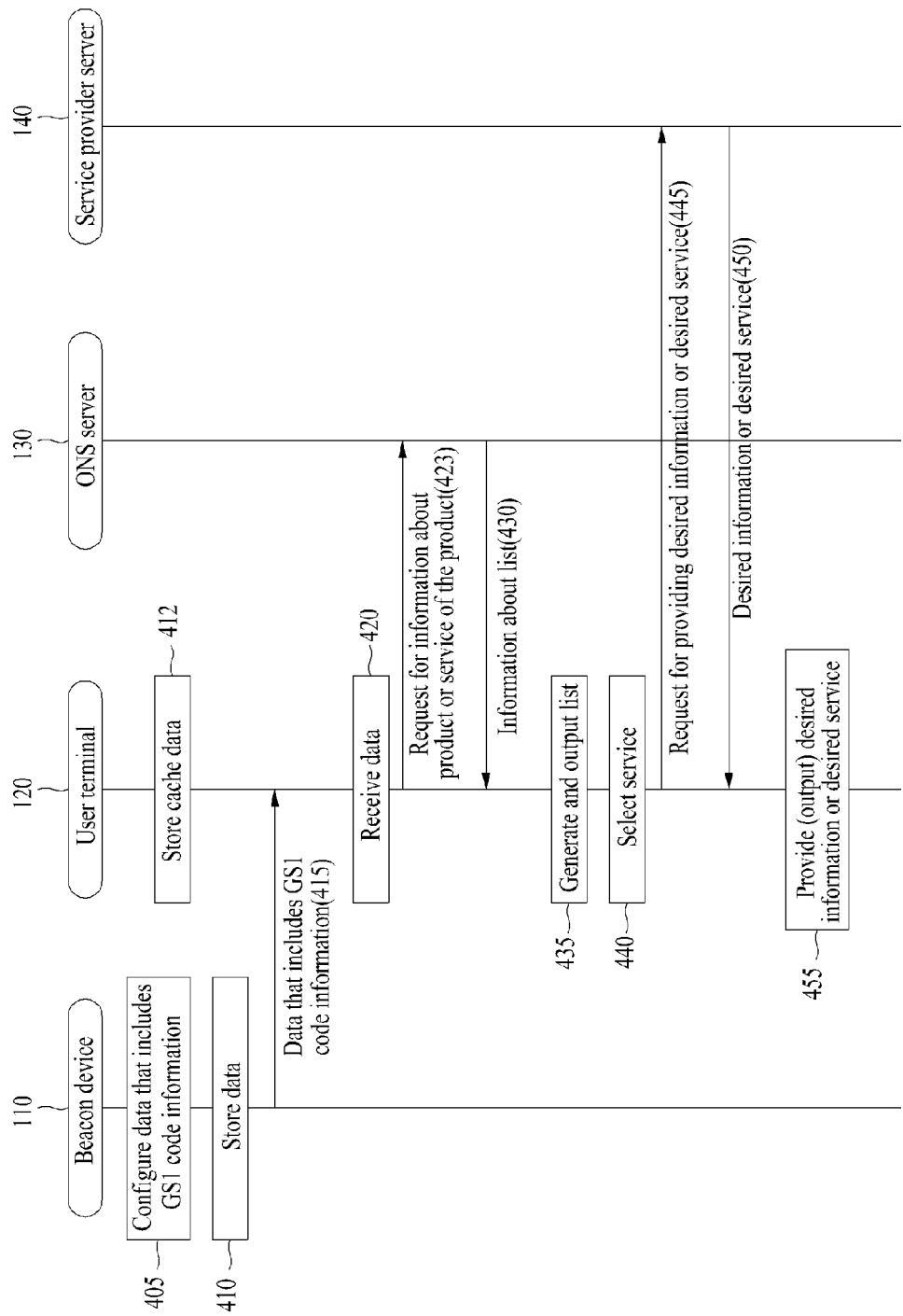
FIG. 4 is a signal flowchart illustrating communication among a beacon device, a user terminal, an ONS server, and a service provider server to provide desired information or a desired service to the user terminal according to at least one example embodiment.

FIG. 4 is a signal flowchart illustrating communication among a beacon device, a user terminal, an ONS server, and a service provider server to provide desired information or a desired service to the user terminal according to at least one example embodiment.

A communication method among the beacon device 110, the user terminal 120, the ONS server 130, and the service provider server 140 will be described with reference to FIG. 4.

In operation 405, data that includes GS1 code information including at least one GS1 code associated with information about at least one product or a service of the product may be configured. The data may be data input from a manufacturer or a manager of the beacon device 110. Information about at least one product or a service of the product associated with the GS1 code (i.e., GS1 code information) may correspond to information about a product or a service provided from the service provider server 140. GS1 code information may include a plurality of GS1 codes.

In operation 410, the storage 220 of the beacon device 110 may store the data configured in operation 405.

In operation 415, the communicator 210 of the beacon device 110 may output data that includes GS1 code information to the user terminal 120 in order to provide a list of information about at least one product or a list of services associated with the GS1 code to the user terminal 120 at a remote location. The output data may be data of an advertising data format and/or data of a scan response data format. Each of data of the advertising data format and data of the scan response data format may include GS1 code information that includes different at least one GS1 code. That is, a service associated with GS1 code information included in data of the advertising data format may be different from a service associated with GS1 code information included in data of the scan response data format.

The data described in operations 405 and 410 will be further described with reference to FIG. 10.

In operation 420, the user terminal 120 may receive data that includes GS1 code information associated with information about at least one product or the service, from the beacon device 110 through the communicator 310. The user terminal 120 may be configured to receive data of the advertising data format and/or data of the scan response data format based on a scheme for receiving the set data.

The controller 320 of the user terminal 120 may extract the GS1 code information from the data received from the beacon device 110.

In operation 423, the user terminal 120 may request the ONS server 130 for a list of information about at least one product or a list of services associated with GS1 code information, based on the extracted GS1 code information through the communicator 310.

The ONS server 130 may refer to a service list or an information list associated with a GS1 code included in the received GS1 code information. Each service or information associated with the GS1 code may be associated with the GS1 code in a record format. A record may be a record of a Name Authority Pointer (NAPTR) type (hereinafter, an NAPTR record).

In operation 430, in response to the request received from the user terminal 120, the ONS server 130 may transmit information about at least one produce or a list of services associated with the GS1 code (i.e., GS1 code information) to the user terminal 120. List information may be a record related to information or the service associated with the GS1 code. The record may include information for access to the service provider server 140 that provides at least one product or service associated with the GS1 code. For example, the record may include URL information as an address to access the service provider server 140.

Also, list information may include service type information of at least one product or service associated with GS1 code information. The service type information may include at least one of information associated with an indication of at least one product or service within the list, information indicating whether at least one product or service corresponds to a global service, and information indicating a class or a level of at least one product or service. Information associated with the indication may be information associated with at least one of an icon, an image, and a language that indicate a service included in the list. Service type information may be managed at a Servicetype Name Service (SNS) server through a service name service in a form of ServiceType.xml. The SNS server may be included in the ONS server 130 and may be present as a separate server.

The record and service type information included in information about a list of at least one product or service associated with GS1 code information may be defined as shown in, for example, the following Table 2. Table 2 shows an example of defining NAPTR record (NAPTR RR) and ServiceType.xml.

TABLE 2

| Field | Format | Description |
|---|---|---|
| NAPTR RRs (managed by ONS) | | |
| Service URL.global service | http://gs1beacon.gs1.org/services/[service_name] | Global service repo. server. |
| Service URL.local service | http://[www.company.com]/services/[service_name] (Ex. [www.kaist.ac.kr] local server prefix) | Local service repo. server. |
| ServiceType.xml (managed by SNS) | | |
| ServiceTypeIdentifier. global | urn:epcglobal:ons:serviceType:global:[service_name] | Unique identifier of services global and local(company) |
| ServiceTypeIdentifier. local | urn:epcglobal:ons:serviceType:local:[company_prefix]:[service_name] | |
| Documentation (for service icon) | Language Code: ICON Location: http://gs1beacon.gs1.org/services/[service_name]/icon.png?[resolution] | Document is used for service icon and description. |
| Documentation (for service description) | Language Code: DESC http://[www.company.com]/services/[service_name]/description.html?[Language_code] | It returns icon.png, and description depends on parameter. (resolution or language code) |
| Abstract.global | 1 | Global service is higher class |
| Abstract.local | 0 | Local service is lower class than Global service |

NAPTR record may include Order, Pref (Preference), Flags, Service, and Regexp (Regular Expression). Order may be an identifier assigned to each service, Preference may be an identifier assigned to identify a service if the condition of Regexp is the same, and Flags may be indicated with "t" or "u". Here, t may indicate that Regexp has a text format and u indicates that Regexp has a URL format.

Service may have a URL format. The URL format may be defined as service_name xml in a group of services with an address of SNS, and may be defined as http://[SNS_URL]/services/[service_name] xml, as for URL expression.

ServiceType.xml may include ServiceTypeIdentifier, Abstract, and Extends. ServiceTypeIdentifier refers to a unique service type identifier and, in the case of a global service, may be defined as a URN format such as urn:epcglobalons:serviceType:global:[service_name] and, in the case of a local service, may be defined as a URN format such as urn:epcglobal:ons:serviceType:local:[company_prefix]:[service_name] Abstract refers to an identifier used to classify a corresponding service into a base (upper) service or a dependent (lower) service. In the case of the global service, the service may be classified into the base service and have a true value. In the case of the local service, the service may be classified into the lower service depending on the global service and have a false value. Documentation refers to a field for storing additional information of a service, and may include a URL of information indicating an icon that represents the service and a type of the service.

The user terminal 120 may be provided with a service associated with the GS1 code in a web based or Electronic Product Code Information service (EPCIS) metadata format by obtaining an EPCIS server URL or an SPS (Service Provider Server) URL included in Regexp of a service record.

An EPCIS server refers to a global distribution event storage, and may be a server configured to standardize an access method and an event occurring in context of a supply network management business, to store the event to be suitable for a standardization, and to provide a query control interface and a query callback interface in order to obtain event information in an external service application. The EPCIS server may be a part of the service provider server 140 and may be a part of the ONS server 130.

In operation 435, the user terminal 120 may generate and output a list of at least one product or service associated with the GS1 code information received from the ONS server 130, based on information about the list through the communicator 310. For example, the user terminal 120 may receive, from the ONS server 130, information about a list that includes a record related to at least one product or service associated with the GS1 code, and may generate and output the list. The user terminal 120 may generate the list based on information indicating an image associated with each service defined in the received service type information, an icon, and a type of the service, etc., and may display the generated list on the display 330.

An image, an icon, and description used for list generation may be obtained from a separate server, for example, an icon&description server. The icon&description server may be a server included in the ONS server 130 or the service provider server 140, or may be a separate server.

In operation 412, the user terminal 120 may store at least a portion of data used to output the list in a cache memory of the storage 340, as cache data. Data stored as cache data may be data frequently used or having a relatively large length when generating the list. For example, data indicating an image and/or an icon may be stored as cache data. Alternatively, operation 412 may be performed after operation 435, which differs from FIG. 4.

Among data used to generate the list, data associated with a service used at the user terminal 120 by a predetermined (or, alternatively, desired) number of times may be stored as cache data. Alternatively, data stored as cache data among data used to generate the list may be data determined based on a Least Recently Used (LRU) algorithm.

The user terminal 120 may generate and output the list by combining cache data stored in the cache memory and information about the list received from the ONS server 130.

Meanwhile, cache data may be at least a portion of data used to provide a list of service(s), and may also be at least a portion of data used to provide a desired service. Data cache will be further described with reference to FIG. 11.

In operation 440, the user of the user terminal 120 may select desired information or a desired service from information and services included in the output list.

In operation 445, the user terminal 120 may request the service provider server 140 for the desired information or the desired service based on the user selection on the output list, through the communicator 310.

In operation 450, in response to the request from the user terminal 120, the service provider server 140 may provide information used to provide the desired information or the desired service to the user terminal 120 and the user terminal 120 may obtain the information.

In operation 455, the user terminal 120 may provide the desired information or the desired service (to the user), based on information obtained from the service provider server 140. For example, the desired information or the desired service may be output through the display 330 and thereby provided to the user. The desired information or the desired service may be provided based on a web.

Although not illustrated, when the user terminal 120 receives data output from the plurality of beacon devices 110, the user terminal 120 may display a list of the plurality of beacon devices 110 on the display 130. The user of the user terminal 120 may receive a list of services, described with operation 435, etc., through the user terminal 120 by selecting the desired beacon device 110 from the list of beacon devices 110.

A method of providing data received from the beacon device 110 and a service or information from the service provider server 140 will be further described with reference to FIGS. 5 through 11.

Technical contents described above with reference to FIGS. 1 through 3 may be applicable as is and a further detailed description is omitted here.

Figure 5:
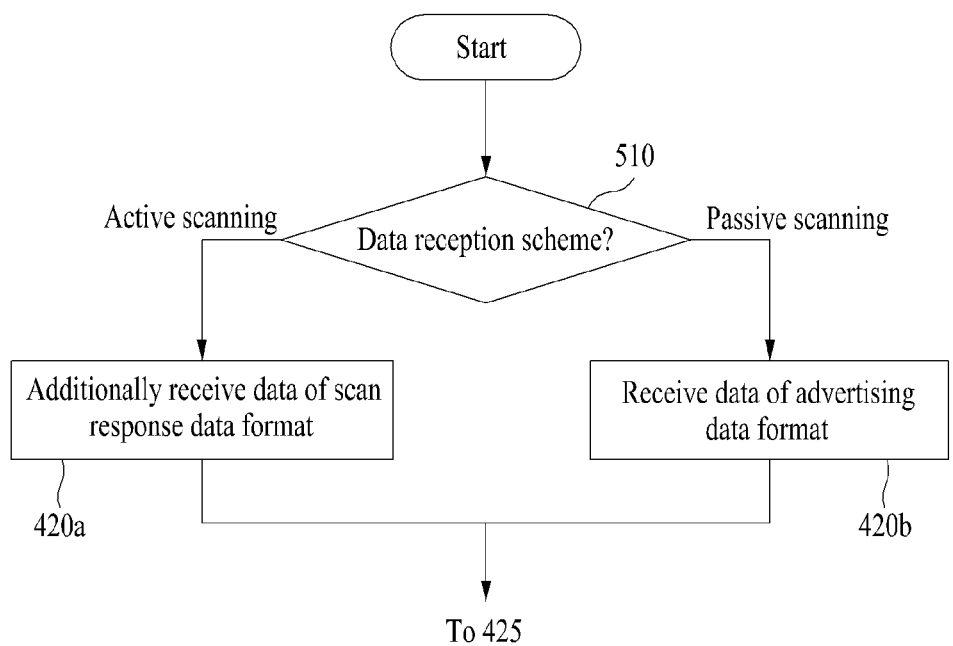
FIG. 5 is a flowchart illustrating a method of determining a data reception scheme in communication between a user terminal and a beacon device according to at least one example embodiment.

FIG. 5 is a flowchart illustrating a method of determining a data reception scheme in communication between a user terminal and a beacon device according to at least one example embodiment.

The user terminal 120 may communicate with the beacon device 110 based on a set data reception scheme. The data reception scheme may indicate a scanning scheme. A scanning mode of the user terminal 120 may be classified into a passive scanning mode and an active scanning mode.

In operation 510, the user terminal 120 may determine a scheme for receiving data from the beacon device 110 into one of the active scanning mode and the passive scanning mode. For example, if the aforementioned integrated application for providing information or a service associated with a GS1 code is executed or is being executed on a background, the user terminal 120 may set the active scanning mode as the scanning mode. Alternatively, the scanning mode of the user terminal 120 may be determined based on settings of or a condition set by the user of the user terminal 120 or a developer of the integrated application.

In the passive scanning mode, the user terminal 120 may receive data output, for example, advertized, from the beacon device 110, and does not transmit a separate request to the beacon device 110.

In the active scanning mode, the user terminal 120 may receive data output, for example, advertized, from the beacon device 110, and may transmit a scan request to the beacon device 110 to request additional data. In response to the scan request, the beacon device 110 may transmit scan response data to the user terminal 120.

In operation 420 of FIG. 4, if the scanning mode set to the user terminal 120 is the passive scanning mode, the user terminal 120 may receive data of the advertising data format from the beacon device 110 in operation 420b. If the scanning mode set to the user terminal 120 is the active scanning mode, the user terminal 120 may additionally receive data of the scan response data format from the beacon device 110 in operation 420a. That is, in the active scanning mode, the user terminal 120 may receive all of data of the advertising data format and data of the scan response data format. Describing from perspective of the beacon device 110, if the data reception scheme of the user terminal 120 is the passive scanning mode, the communicator 310 may output data of the advertising data format to the user terminal 120. If the data reception scheme of the user terminal 120 is the active scanning mode, the communicator 310 may (additionally) transmit at least scan response data format data to the user terminal 120.

Data of the advertising data format and data of the scan response data format may include GS1 code information that includes different at least one GS1 code, respectively. That is, a type of the GS1 code included in data received at the user terminal 120 from the beacon device 110 may be different based on the determined scanning mode of the user terminal 120.

Accordingly, the user terminal 120 may be configured to output a different service list and to provide a different service to the user based on the determined scanning mode.

A structure for data of the advertising data format and data of the scan response data format will be further described with reference to FIG. 10.

Technical contents described with reference to FIGS. 1 through 4 may be applicable as is and a further description is omitted.

Figure 6:
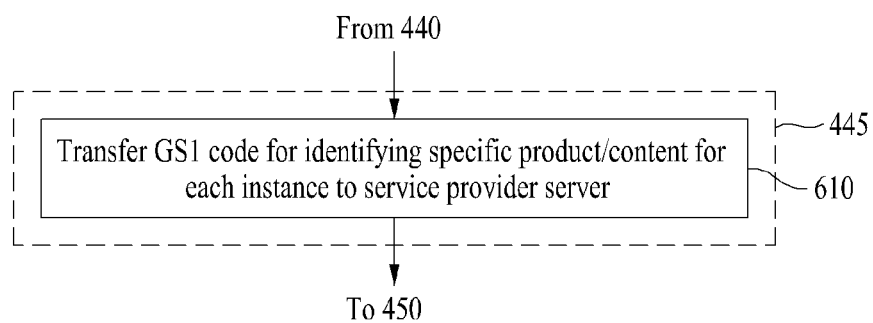
FIG. 6 is a flowchart illustrating a method of providing a desired service to a user terminal using a GS1 code used to classify a specific product/content for each instance according to at least one example embodiment.

FIG. 6 is a flowchart illustrating a method of providing a desired service to a user terminal using a GS1 code used to classify a specific product/content for each instance according to at least one example embodiment.

GS1 code information received from the beacon device 110 may include at least one GS1 code. The GS1 code included in the GS1 code information may be a GS1 code that classifies a specific product or content for each class or a GS1 code that classifies the specific product or content for each instance.

The GS1 code that classifies the specific product or content for each class may be a GS1 code that represents the same type of or same object using the same code. The GS1 code that classifies the specific product or content for each instance may be a GS1 code that distinguishably represents each thing object as a different object even for the same type of or same object. For example, GTIN may be the GS1 code that classifies the specific product or content for each class and GTIN serial number may be the GS1 code that classifies the specific product or content for each instance.

Alternatively, the GS1 code that classifies the specific product or content for each instance may be further detailed information and a service and a GS1 code compared to the GS1 code that classifies the specific product or content for each class. For example, GLN may be the GS1 code that classifies the specific product or content for each class and GLN extension may be the GS1 code that classifies the specific product or content for each instance.

If GS1 code information includes a plurality of GS1 codes, GS1 code information may include the GS1 code that classifies the specific product or content for each class and the GS1 code that classifies the specific product or content for each instance. Here, the list output in operation 435 of FIG. 4 may be a list of service(s) associated with the GS1 code that classifies the specific product or content for each class. That is, the user terminal 120 may transmit a request for using the GS1 code that classifies the specific product or content for each class to the ONS server 130, and may generate and output a list of service(s) associated with the GS1 code that classifies the specific product or content for each class based on information received from the ONS server 130.

In response to the user selection in operation 440, in operation 610 the user terminal 120 may transfer the GS1 code that classifies the specific product or content for each instance to the service provider server 140. In operation 450, the user terminal 120 may receive instance information of the specific product or content from the service provider server 140 having receiving the GS1 code that classifies the specific product or content for each instance. Accordingly, in operation 455, the user terminal 120 may provide a service associated with the specific product or content to the user.

That is, the GS1 code that classifies the specific product or content for each class may be used to provide a list of services to the user terminal 120. The GS1 code that classifies the specific product or content for each instance may be used as a parameter to provide a service associated with the specific product or content to the user terminal 120.

For example, if GTIN is the GS1 code that classifies the specific product or content for each class and a GTIN serial number is the GS1 code that classifies the specific product or content for each instance, GTIN may be a GS1 code that classifies individual Coca-cola or Coca-cola zero, and the GTIN serial number may be a GS1 code that classifies a specific product of Coca-cola or a specific product of Coca-cola zero. If the user terminal 120 receives, from the beacon device 110, data that includes GTIN and GTIN serial number, the user terminal 120 may transfer GTIN to the ONS server 130 and receive, from the ONS server 130 detailed information of Coca-cola, for example, prices, sales information, event and coupon information, etc., and may output a list of related services. If the user of the user terminal 120 selects detailed information of Coca-cola, the ser terminal 120 may transmit GTIN serial number to the service provider server 140, may receive, from the service provider server 140, detailed information, for example, a manufactured date, a manufacturer, and a history tracking, etc., of specific Coca-cola to which the beacon device 110 is attached, and may provide the received detailed information to the user.

The aforementioned example embodiments may be applicable to provide a service about a product associated with distribution tracking (pallet tracking) or identifying a specific product.

Also, referring to the example embodiments of FIG. 5, the GS1 code that classifies the specific product or content for each class may be included in data of the advertising data format and the GS1 code that classifies the specific product or content for each instance may be included in data of the scan response data format. In this case, only when the data reception scheme of the user terminal 120 is the active scanning mode, information or a service associated with the GS1 code that classifies the specific product or content for each instance may be provided.

Technical contents described above with reference to FIGS. 1 through 5 may be applicable as is and a further detailed description is omitted.

Figure 7:
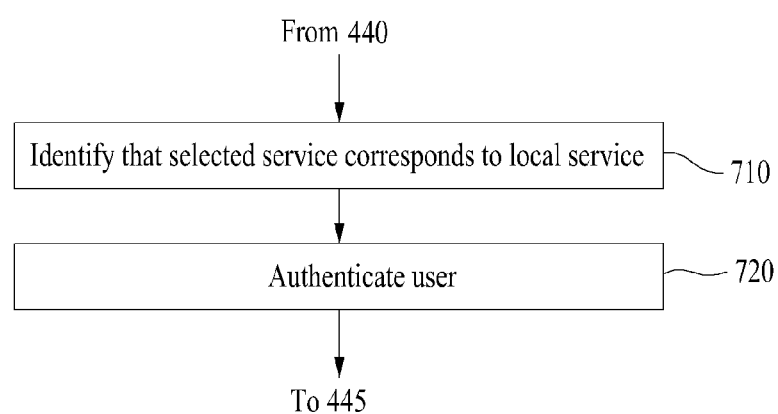
FIG. 7 is a flowchart illustrating a method of providing a local service to a user terminal as a desired service according to at least one example embodiment.

FIG. 7 is a flowchart illustrating a method of providing a local service to a user terminal as a desired service according to at least one example embodiment.

A service included in the list, for example, a service provided from the service provider server 140 may be classified into a global service a user is accessible to without separate authentication and a local service the user is accessible to after authentication.

In operation 440 of FIG. 4, the service selected by the user may be the local service.

In operation 710, the user terminal 120 may identify that the service selected by the user corresponds to the local service.

In operation 720, the user terminal 120 may request the user for a predetermined authentication procedure for access to the local service. The authentication procedure may employ any type of methods for authenticating the user. For example, the user terminal 120 may request the user to input a password, a fingerprint, or an identification code as authentication information. The user terminal 120 may transmit the input authentication information to the service provider server 140 that provides the local service, and may receive a message indicating that the authentication is completed from the service provider server 140.

That is, in response to a user selection on the local service from the output list, the user terminal 120 may complete a predetermined authentication and may provide the local service to the user.

The local service refers to a private service provided from a service provider, and may be a service issued from and managed at a private institution, such as a store, a company, a hospital, etc. For example, a private service, such as a private Wi-Fi authentication service a private security service, a private map, etc., may correspond to the local service.

Technical contents described with reference to FIGS. 1 through 6 may be applicable as is and a further detailed description is omitted here.

Figure 8:
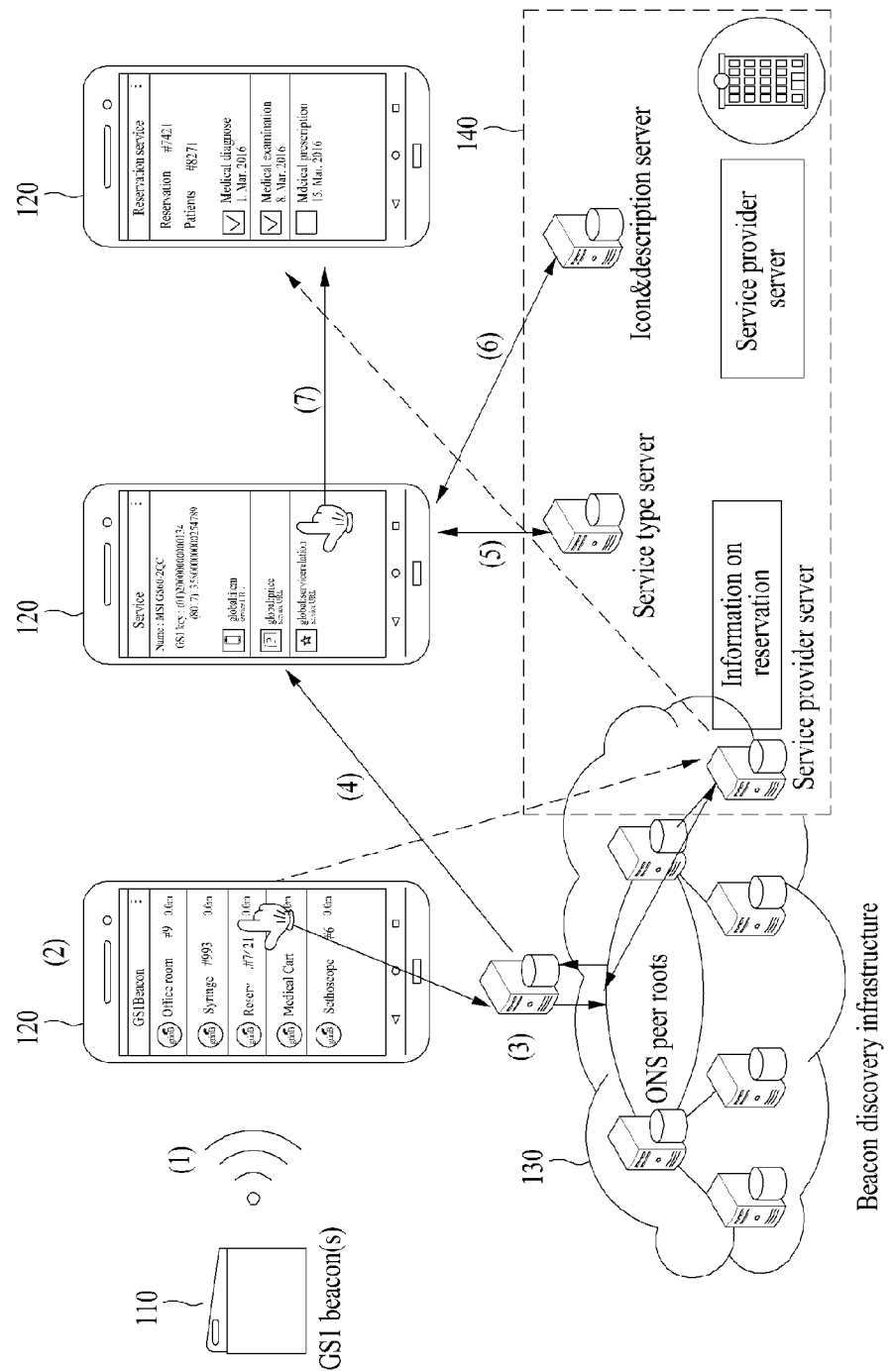
FIG. 8 illustrates an example of providing desired information or a desired service to a user terminal through communication among a beacon device, a user terminal, an ONS server, and a service provider server according to at least one example embodiment.

FIG. 8 illustrates an example of providing desired information or a desired service to a user terminal through communication among a beacon device, a user terminal, an ONS server, and a service provider server according to at least one example embodiment.

FIG. 8 illustrates a method of providing, at the user terminal 120, a desired service associated with a GS1 code.

(1) GS beacon(s) (that is, the beacon device(s)) 110 may output data that includes GS1 code information. (2) The user terminal 120 may receive, from the GS1 beacon(s) 110, the data that includes GS1 code information. The data may include data for identifying a GS1 beacon. If a plurality of GS1 beacons 110 outputs data, the user terminal 120 may output a list for selecting a single GS1 beacon from among the plurality of GS1 beacons 110. (3) In response to a selection from the user terminal 120 on a desired GS1 beacon (Reserv. ~) from the list, the user terminal 120 transmits, to the ONS server 130, a service list request that includes a GS1 code transmitted from the selected GS1 beacon to the user terminal 120. The ONS server 130 may be a beacon discovery infrastructure (ONS discovery infrastructure) and may be configured as a plurality of servers. The ONS server 130 may identify services associated with the GS1 code. (4) The ONS server 130 may transmit information about a list of the identified services to the user terminal 120. The user terminal 120 may generate and output a list of services associated with the GS1 code based on information received from the ONS server 130. The user may select a single service from among the services included in the list as a desired service. (5), (6) In response to the selection, the user terminal 120 may receive service type information, icon information, and description information required to provide the desired service, from a service type server and an icon&description server includable in the service provider server 140. (7) The service provider server 140 may provide the desired service selected by the user to the user terminal 120, and the user terminal 120 may output the desired service (information about the service) to the user and may provide the desired service to the user.

The service type server and the icon&description server may refer to a server that provides service type information, icon information, and description information used to generate a list of services associated with the GS1 code of (4). The service type server and the icon&description server may be provided as a portion of the ONS server 130 or may be present as a separate server, which differs from FIG. 8.

Also, as illustrated, a portion of the service provider server 140 may be a portion of the ONS server 130.

That is, in an example in which the user terminal 130 provides a list of services and a desired service, the service provider server 140 and the ONS server 130 may be configured to be different from the illustrated arrangement of servers.

Technical contents described above with reference to FIGS. 1 through 7 may be applicable to as is and a further detailed description is omitted.

Figure 9:
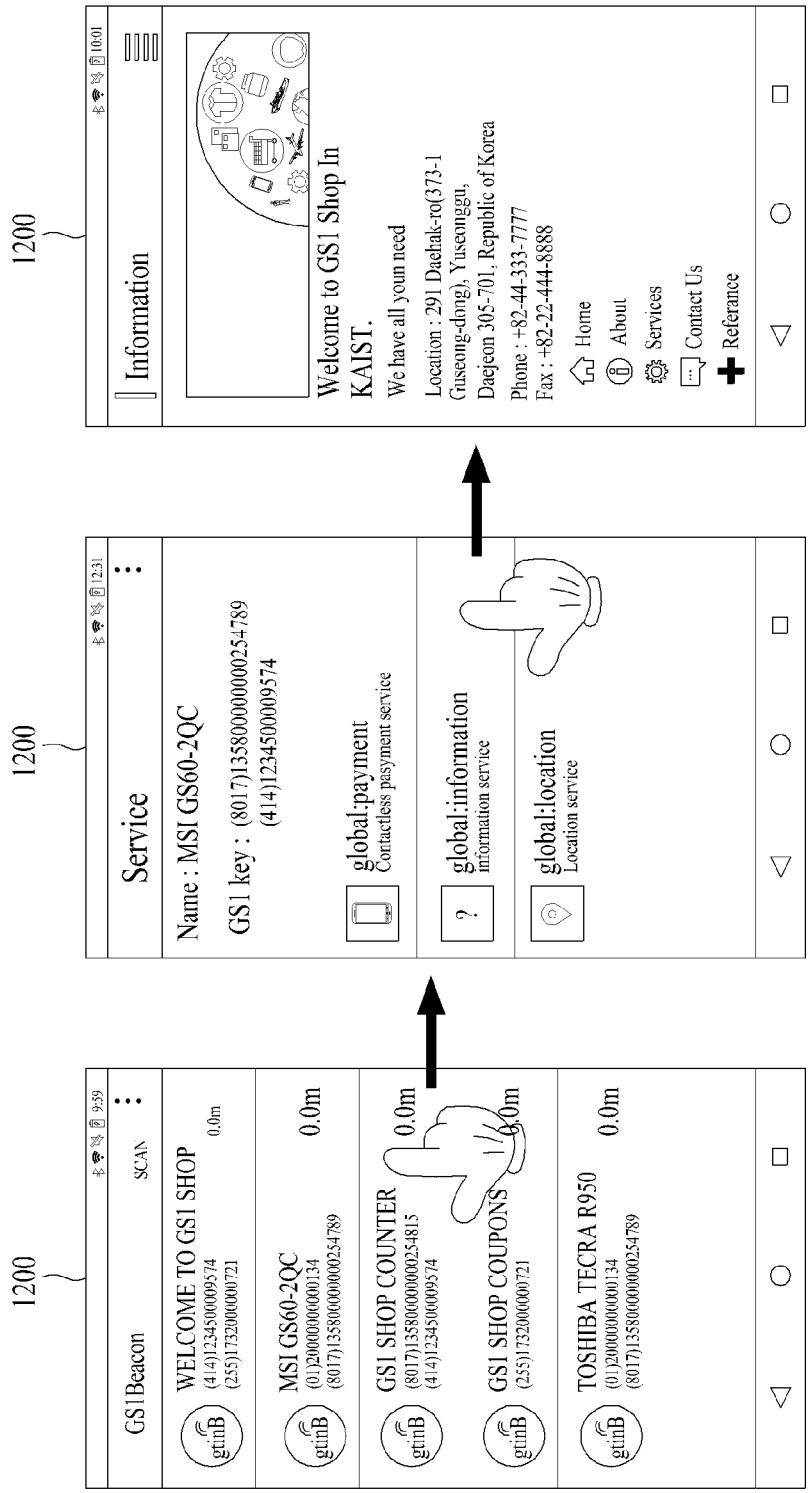
FIG. 9 illustrates an example of providing a desired service by selecting, at a user terminal, a single beacon device from among a plurality of beacon devices, by outputting a list of services associated with a GS code included in data received from the selected beacon device, and by selecting the desired service from a list of services according to at least one example embodiment.

FIG. 9 illustrates an example of providing a desired service by selecting a single beacon device from among a plurality of beacon devices at a user terminal, by outputting a list of services associated with a GS code included in data received from the selected beacon device, and by selecting the desired service from a list of services according to at least one example embodiment.

A first picture from the left illustrates an example of a list of beacon devices output to the user terminal 120 to select a desired beacon device in response to the plurality of beacon devices having output data to the user terminal 120. The list may include a description about each beacon device, or a name of a beacon (WELCOME TO GS1 SHOP), a type (glnB) of a GS1 code output from a corresponding beacon device, a GS1 code ((414)1234500009574, (255) 1732000000721) output from the corresponding beacon device, and a distance between the corresponding beacon device and the user terminal 120.

A second picture from the left illustrates an example of a list of services associated with a GS1 code included in data output from a beacon device selected at the user terminal 120. A description about each beacon device or a name of a beacon, and a GS1 code (GS1 key) output from a corresponding beacon device may be displayed on the user terminal 120. In association with a service included in the list, information (global or local) indicating a type of the service, a service name (e.g., a payment), a description about the service (e.g., a contactless payment service), an icon indicating the service, and the like, may be displayed on the user terminal 120. For example, at least one global service and at least one local service associated with GS1 code information included in the list may be distinguished from each other within the list and thereby output.

A third picture from the left illustrates an example of a desired service output to the user terminal 120. The desired service may be a service selected from the list of services of the second picture. The desired service may be provided to the user based on a web.

Technical contents described above with reference to FIGS. 1 through 8 may be applicable as is and a further detailed description is omitted.

Figure 10:
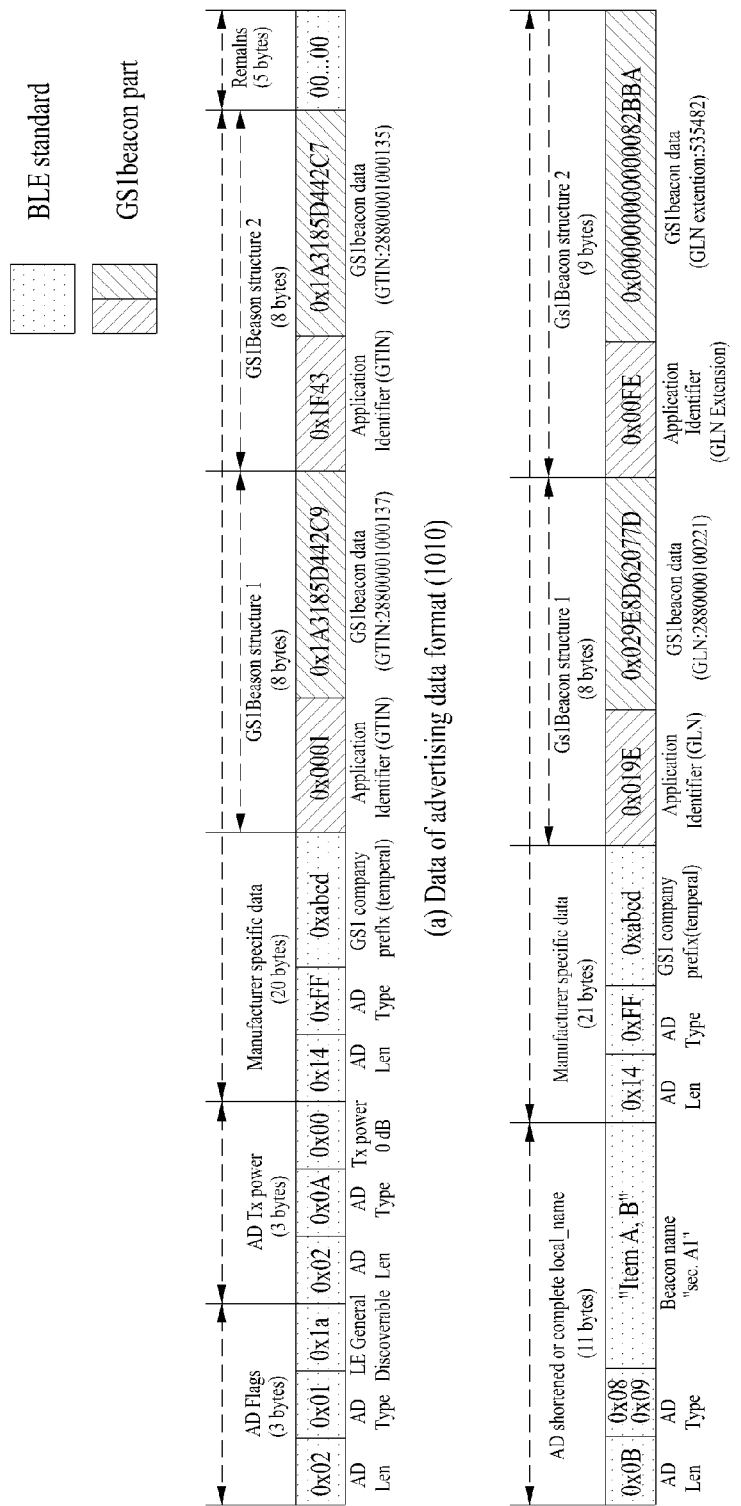
FIG. 10 illustrates data of an advertising data format and data of a scan response data format as data output from a beacon device according to at least one example embodiment.

FIG. 10 illustrates data of an advertising data format and data of a scan response data format as data output from a beacon device according to at least one example embodiment.

FIG. 10 illustrates a structure of data 1010 of the advertising data format and a structure of data 1020 of the scan response data format.

When the user terminal 120 is in an active scanning mode, the data 1010 and the data 1020 may be transmitted from the beacon device 110 to the user terminal 120. When the user terminal 120 is in the active scanning mode, only the data 1010 may be transmitted from the beacon device 110 to the user terminal 120.

The data 1010 may include, for example, three AD_structures, for example, flag, tx power, and manufacturer specific data. The flag denotes a BLE discoverable option, and the tx power may be used to calculate a distance between the user terminal 120 and the beacon device 110. The manufacturer specific data may include a company prefix and plurality of GS1beacon structures. The company prefix may be used to identify a beacon. For example, the company prefix 0x004c denotes Apple. The GS1beacon structure may include an application identifier (AI) header and a hexadecimal GS1 ID key. The AI header may denote a type and a length of the GS1 ID key. The GS1 ID key may be a variable length GS1 code, for example, GTIN, GTIN serial number, GLN extension, GIAI, GDTI, GINC, and GCN.

The data 1020 may include, for example, two AD_structures, for example, a local name and manufacturer specific data. The local name may represent a shortened (0x08) or complete (0x09) local name of a GS1beacon device. A message format of manufacturer specific data of the data 1020 may be equal to that of the data 1010.

A GS1beacon part in the manufacturer specific data may be set and/or modified by a manager or a manufacturer of a beacon device.

Referring to FIG. 10, each of the data 1010 and the data 1020 may include a different GS1 code. Thus, based on a scanning mode of the user terminal 120, the user terminal 120 may provide a different service. Alternatively, in the active scanning mode, the user terminal 120 may provide a further detailed service or more services.

Technical contents described above with reference to FIGS. 1 through 9 may be applicable as is and a further detailed description is omitted.

Figure 11:
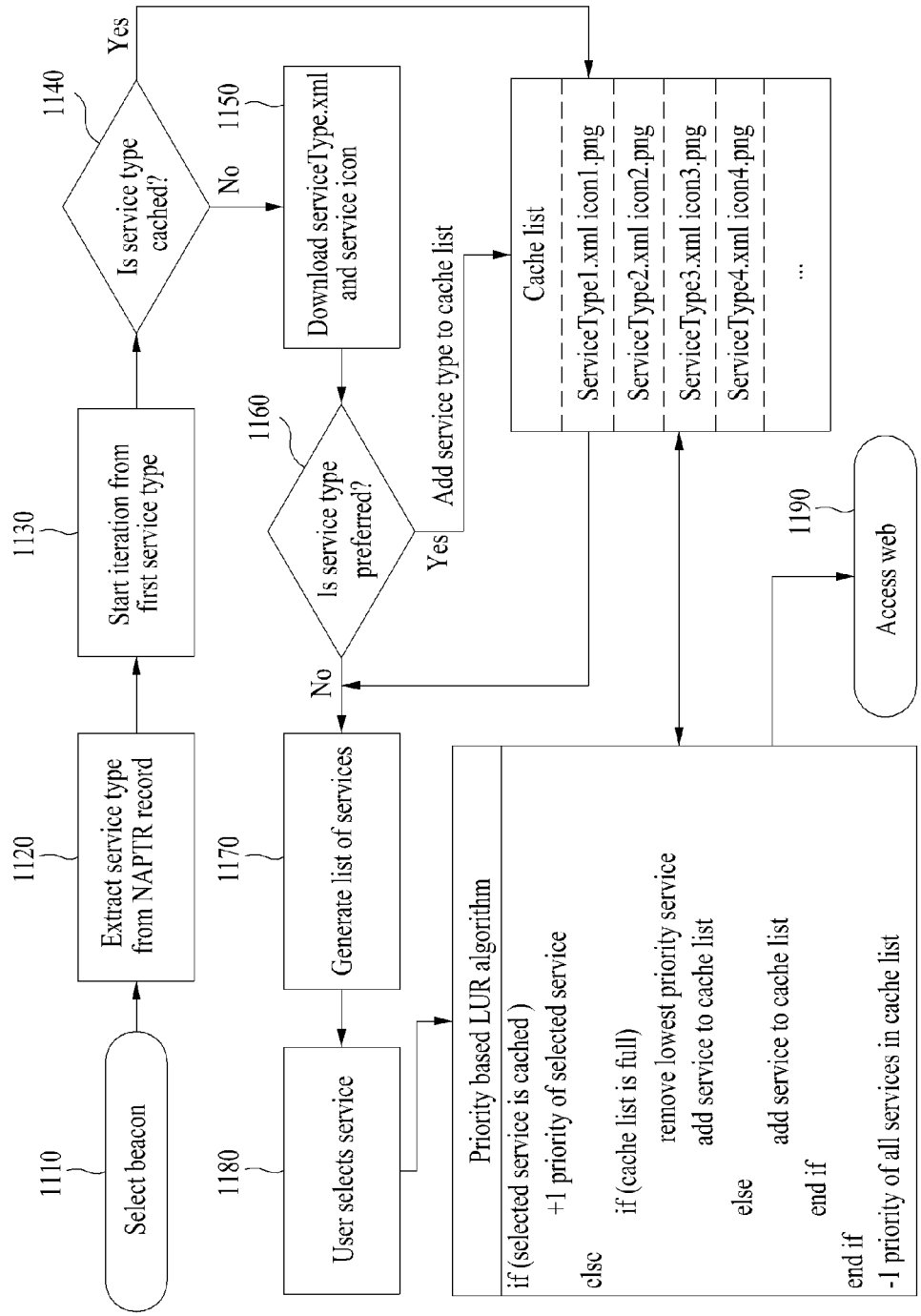
FIG. 11 illustrates an example in which a user terminal stores at least a portion of data required to output a list of service(s) associated with a GS1 code as cache data according to at least one example embodiment.

FIG. 11 illustrates an example in which a user terminal stores at least a portion of data required to output a list of service(s) associated with a GS1 code as cache data according to at least one example embodiment.

Technical features associated with operation 412 of FIG. 4 will be further described with reference to FIG. 11. In operation 1110, a desired beacon device may be selected from a list of beacon devices output to the user terminal 120. In operation 1120, the user terminal 120 may extract service type information from an NAPTR record received from the ONS server 130. In operations 1130 and 1140, the user terminal 120 may determine whether a service type is cached with respect to each extracted service type. In operation 1170, if a corresponding service type is cached, the user terminal 120 may generate a list of services by referring to a cache list. On the contrary, if the service type is not cached, the user terminal 120 may download service-Type.xml and a service icon from, for example, the ONS server 130, the service provider server 140, or a separate server in operation 1150, and may determine whether the corresponding service type is preferred by the user in operation 1160. If the service type is preferred based on, for example, a use frequency, the user terminal 120 may add the corresponding service type to the cache list and then generate a list of services in operation 1170. On the contrary, if the service type is not preferred, the user terminal 120 may generate a list of services without adding the corresponding service type to the cache list in operation 1170. In response to a user selection on a desired service from the list in operation 1180, the user terminal 120 may access a web, for example, the service provider server 140 and may provide the selected desired service to the user based on the web. The desired service to be output to the user terminal 120 may be output to the user terminal 120 based on data stored in the cache list according to an LRU algorithm. The LRU algorithm may follow, for example, a code shown in FIG. 11.

Technical contents described above with reference to FIGS. 1 through 10 may be applicable as is and a further detailed description is omitted.

Figure 12:
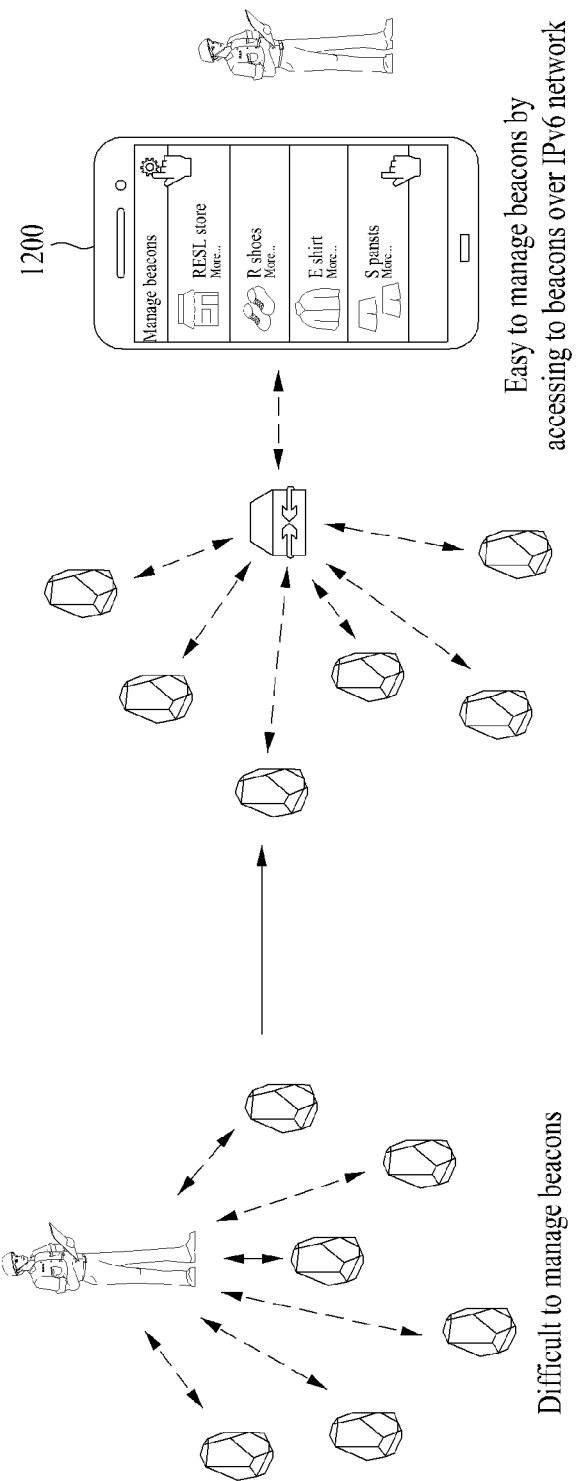
FIG. 12 illustrates an example of comparing a case in which beacon device(s) are connected to an external terminal through an Internet Protocol version 6 (IPv6) network and a case in which beacon device(s) are not connected according to at least one example embodiment.
Figure 13:
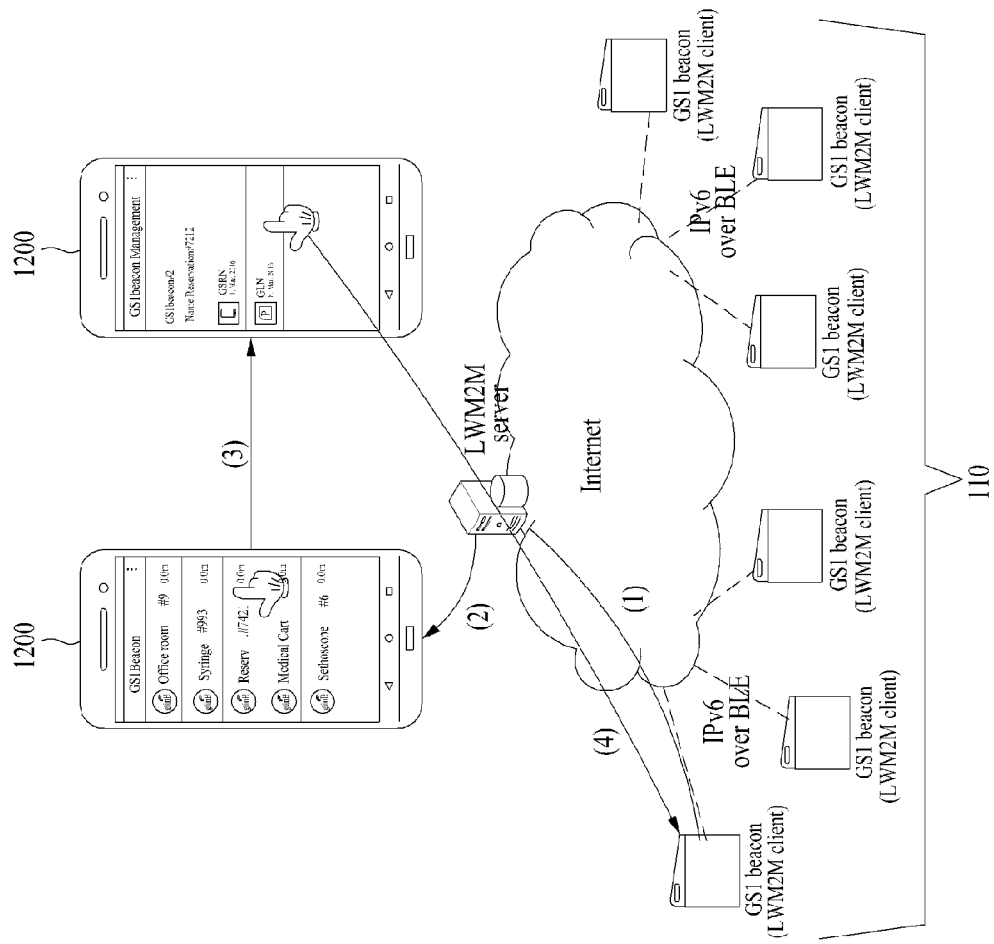
FIG. 13 illustrates an example of connecting beacon device(s) to an external terminal through an IPv6 network to manage beacon device(s) according to at least one example embodiment.

FIG. 12 illustrates an example of comparing a case in which beacon device(s) are connected to an external terminal through an Internet Protocol version 6 (IPv6) network and a case in which beacon device(s) are not connected according to at least one example embodiment, and FIG. 13 illustrates an example of connecting beacon device(s) to an external terminal through an IPv6 network to manage beacon device(s) according to at least one example embodiment.

When a plurality of beacon devices is present, a manager is to directly access each beacon device and to perform a corresponding management or change of settings in order to manage or change settings of each of the plurality of beacon devices. Thus, it may be difficult to maintain and repair a beacon device.

In one example embodiment, the communicator 210 of the beacon device 110 may be directly connected to an external 1200 through connection to the Internet directly or via a gateway. A parameter that configures data stored in the storage 220 and settings of the beacon device 110 may be configured to be changed through the external terminal 1200. The external terminal 1200 may be a PC, a notebook computer, a laptop computer, a smartphone, a tablet, a wearable computer, and the like. The beacon device 110 may be connected to the Internet over an Internet Protocol version 6 (IPv6) network, and may be connected to the external terminal 1200 through the Internet. As a beacon management becomes easy, an integrated management, maintenance, and repairmen for the plurality of beacon devices 110 may be performed through the external terminal 1200.

The beacon device 110 may be configured as a client that observes a Lightweight Machine-to-Machine (LWM2M) related standard. An Internet-based server that accesses the external terminal 1200 and the beacon device 110 may be a server that observes a LWM2M related standard.

Protocols for managing the beacon device 110 may be defined as shown in, for example, Table 3 and Table 4. Table 3 shows an object definition and Table 4 shows a resource definition (R: Read, W: Write, E: Execute).

TABLE 3

| Name | Object ID | Instance | Mandatory | Object URN |
|---|---|---|---|---|
| GS1beacon | 32000 (Objects defined by a vendor or individual such an object may be either private) | Single | Yes | urn:oma:lwm2m:x:32000 |

TABLE 5

| ID | Name | Oper. | Instance | Mandatory | Type | Unit | Description |
|---|---|---|---|---|---|---|---|
| 0 | Name | R, W | Single | Mandatory | String | — | Name of beacon |
| 1 | Beacon switch | R, E | Single | Mandatory | Boolean | — | Power switch of beacon |
| 2 | Battery level | R | Single | Mandatory | Float | Ah | Battery level of beacon |
| 3 | Tx power | R, W | Single | Mandatory | Float | dB | Tx power of beacon (range of beacon) |
| 4 | Tx interval | R, W | Single | Mandatory | Float | Ms | Tx interval of beacon (life time of beacon) |
| 5 | Firmware version | R, W | Single | Optional | String | — | Firmware version of beacon |
| 6 | GS1 code | R, W | Multiple | Mandatory | String | — | GS1 codes |

Referring to (1) through (4), the external terminal 1200 may identify the plurality of beacon devices 110 connected to the external terminal 1200 through the Internet, may select a beacon device to manage, and may adjust settings and/or data of the selected beacon device.

Technical contents described above with reference to FIGS. 1 through 12 may be applicable as is and a further detailed description is omitted.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A service providing method comprising:
   receiving, from a beacon device, data that includes Global Standard #1 (GS1) code information associated with information about at least one product or service of the product;
   requesting an Object Name Service (ONS) server for a list of information about the at least one product or service based on the GS1 code information extracted from the received data;
   outputting the list based on information about the list that is received from the ONS server in response to the request; and
   obtaining and providing desired information about a product or information about a desired service included in the list from a service provider server in response to a selection a user made on the list.

2. The method of claim 1, wherein each of the at least one product or service is associated with a GS1 code included in the GS1 code information, in a record format, and
   the outputting of the list comprises outputting the list by receiving, from the ONS server, information about the list that includes a record associated with the at least one product or service, and
   the record includes information for access to the service provider server that provides the at least one product or service.

3. The method of claim 2, wherein information about the list includes service type information of the at least one product or service,
   information for the access includes uniform resource locator (URL) information for access to the service provider server that provides the at least one product or service, and
   the service type information includes at least one of information associated with an indication of the at least one product or service within the list, information indicating whether the at least one product or service corresponds to a global service, and information indicating a class or a level of the at least one product or service.

4. The method of claim 1, further comprising:
   determining a scheme for receiving data from the beacon device in one of an active scanning mode and a passive scanning mode,
   wherein a type of a GS1 code included in the received data is differentiated based on the determined scheme.

5. The method of claim 4, wherein the data that includes the received GS1 code information is at least one of data of an advertising data format and data of a scan response data format,
   the data of the advertising data format includes first GS1 code information including a first GS1 code and the data of the scan response data format includes second GS1 code information including a second GS1 code different from the first GS1 code, and
   the receiving of the data comprises:
   receiving the data of the advertising data format in response to the determined scheme being the passive scanning mode; and
   receiving the data of the advertising data format and the data of the scan response data format in response to the determined scheme being the active scanning mode.

6. The method of claim 1, wherein the GS1 code information includes at least one GS1 code, and
   the at least one GS1 code includes at least one of a GS1 code that classifies a specific product or content for each class and a GS1 code that classifies the specific product or content for each instance.

7. The method of claim 6, wherein the GS1 code information includes the GS1 code that classifies the specific product or content for each class and the GS1 code that classifies the specific product or content for each instance, and
   the outputting of the list comprises outputting a list of services associated with the specific product or content from the ONS server in response to a request using the GS1 code that classifies the specific product or content for each class, and
   the obtaining and the providing of the desired service comprises:
   transferring the GS1 code that classifies the specific product or content for each instance to a service provider server that provides a service selected by the user from the list; and
   providing a service associated with the specific product or content based on instance information of the specific product or content received from the service provider server to which the GS1 code that classifies the specific product or content for each instance is transferred.

8. The method of claim 1, further comprising:
   storing at least a portion of data required to output the list as cache data,
   wherein the outputting of the list comprises generating and outputting the list by combining the cache data and information about the list.

9. The method of claim 8, wherein the data stored as the cache data is determined based on a Least Recently Used (LRU) algorithm.

10. The method of claim 1, wherein information about the at least one product or service associated with the GS1 code information includes at least one of a global service the user is accessible to without separate authentication and a local service the user is accessible to after authentication, and
    the obtaining and the providing of the desired service comprises providing the local service once the authentication of the user is completed in response to a selection of the user on the local service from the list.

11. The method of claim 10, wherein at least one global service and at least one local service associated with the GS1 code information included in the list are distinguished from each other within the list and thereby output.

12. A beacon device comprising:
    a storage configured to store data that includes Global Standard #1 (GS1) code information including at least one GS1 code associated with information about at least one product or a service of the product; and
    a communicator configured to output the data that includes the GS1 code information to a user terminal at a remote place, in order to provide information about a list of the at least one product or service to the user terminal,
    wherein the GS1 code information includes a plurality of GS1 codes,
    the plurality of GS1 codes includes a GS1 code that classifies a specific product or content for each class and a GS1 code that classifies the specific product or content for each instance, the GS1 code that classifies the specific product or content for each class is used to provide the list to the user terminal, and the GS1 code that classifies the specific product or content for each instance is used as a parameter to provide a service associated with the specific product or content to the user terminal.

13. The beacon device of claim 12, wherein the GS1 code information includes at least one of a global service a user of the user terminal is accessible to without separate authentication and a local service the user is accessible to after authentication, as information about the at least one product or service.

14. The beacon device of claim 12, wherein the communicator is further configured to communicate with the user terminal through Bluetooth Low Energy (BLE).

15. The beacon device of claim 12, wherein the communicator is further configured to connect to an external terminal through connection to the Internet directly or via a gateway, and
a parameter that configures the data stored in the storage or settings of the beacon device are configured to be changed through the external terminal.

16. A beacon device comprising:
a storage configured to store data that includes Global Standard #1 (GS1) code information including at least one GS1 code associated with information about at least one product or a service of the product; and
a communicator configured to output the data that includes the GS1 code information to a user terminal at a remote place, in order to provide information about a list of the at least one product or service to the user terminal,
wherein the GS1 code information includes a plurality of GS1 codes,
the plurality of GS1 codes includes a GS1 code that classifies a specific product or content for each class and a GS1 code that classifies the specific product or content for each instance,
the GS1 code that classifies the specific product or content for each class is used to provide the list to the user terminal, and
the GS1 code that classifies the specific product or content for each instance is used as a parameter to provide a service associated with the specific product or content to the user terminal,
wherein the data is data of an advertising data format or data of a scan response data format,
the data of the advertising data format includes first GS1 code information indicating a first GS1 code and the data of the scan response data format includes second GS1 code information indicating a second GS1 code different from the first GS1 code, and
the communicator is further configured to output the data of the advertising data format to the user terminal in response to a data reception scheme of the user terminal being a passive scanning mode, and to transmit the data of the advertising data format and the data of the scan response data format to the user terminal in response to the data reception scheme of the user terminal being an active scanning mode.

17. A terminal device comprising:
a communicator configured to receive, from a beacon device, data that includes Global Standard #1 (GS1) code information associated with information about at least one product or a service of the product;
a controller configured to request an Object Name Service (ONS) server for a list of information about the at least one product or service based on the GS1 code information extracted from the received data, to obtain the list based on information about the list that is received from the ONS server in response to the request, and to obtain desired information about a product or information about a desired service included in the list from a service provider server in response to a selection a user made on the list; and
a display configured to output the list and the desired information or the desired service.

18. An operation method of a beacon device, the method comprising:
configuring data that includes Global Standard #1 (GS1) code information including at least one GS1 code associated with information about at least one product or a service of the product;
storing the configured data; and
outputting the data that includes the GS1 code information to a user terminal at a remote place in order to provide a list of information about the at least one product or service to the user terminal
wherein the GS1 code information includes a plurality of GS1 codes,
the plurality of GS1 codes includes a GS1 code that classifies a specific product or content for each class and a GS1 code that classifies the specific product or content for each instance,
the GS1 code that classifies the specific product or content for each class is used to provide the list to the user terminal, and
the GS1 code that classifies the specific product or content for each instance is used as a parameter to provide a service associated with the specific product or content to the user terminal.

* * * * *